UNITED STATES PATENT OFFICE.

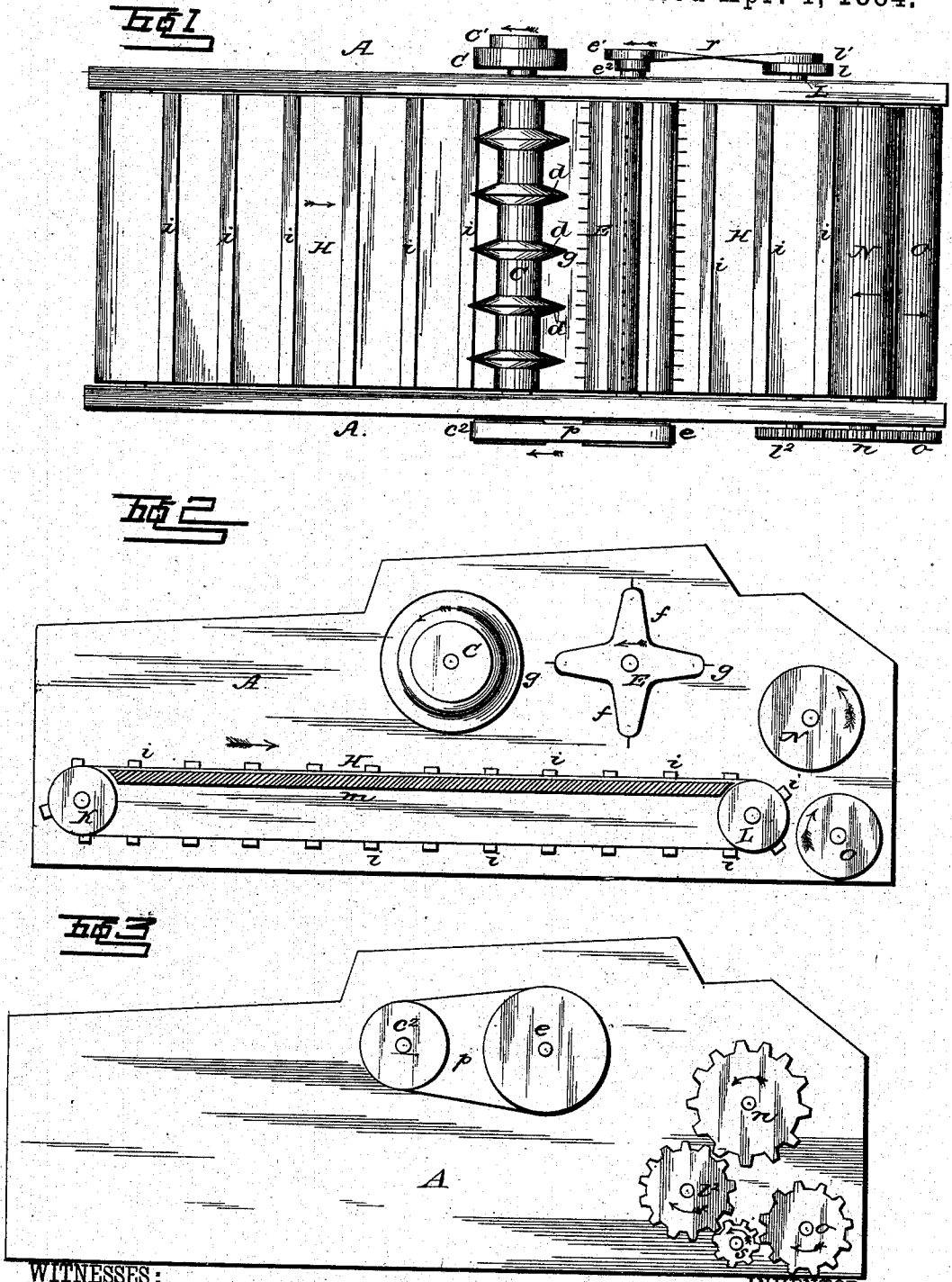

SAMUEL SAMUELS BARR, OF WAUKON, IOWA.

SELF-FEEDING AND BAND-CUTTING ATTACHMENT FOR THRASHING-MACHINES.

SPECIFICATION forming part of Letters Patent No. 296,109, dated April 1, 1884.

Application filed July 11, 1882. (No model.)

*To all whom it may concern:*

Be it known that I, SAMUEL S. BARR, a citizen of the United States, residing at Waukon, in the county of Allamakee and State of Iowa, have invented certain new and useful Improvements in Self-Feeding and Band-Cutting Attachments for Thrashing-Machines; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

The object of this invention is to provide a practical and durable attachment for thrashing-machines, which shall be so constructed as to be capable of receiving the bundles of grain promiscuously, and, after cutting the bands and spreading the bundles, shall carry the grain, in proper condition and in regulated quantities, to the thrashing-machine cylinder without requiring the attendance of skilled help.

To this end the attachment consists, mainly in a carrier-apron, a revolving band-cutter, a revolving spreader, and revolving feed-rollers, all so connected by bands, double pulleys, and gearing that the grain shall be continuously and regularly carried forward to the thrashing-cylinder, and at a regulated speed.

The parts will be more fully set forth and described hereinafter, and the invention will be particularly pointed out in the claims.

Referring to the drawings, Figure 1 is a plan view of the working parts, double pulleys, band-connections, and gearing, the cover being removed. Fig. 2 is a vertical longitudinal section, showing the internal working parts in relative position; and Fig. 3 is a side elevation, showing the gearing, &c.

Similar letters of reference indicate like parts where the said letters occur in the several figures.

A is the frame, supported by suitable journal-bearings and containing the working parts, and C represents a revolving shaft provided with circular disks or cutters $d$, for cutting the bands.

E is the spreader-cylinder, provided with ribs $f$ and teeth $g$, for loosening and spreading the bundles.

H is the carrier-apron, having cross-strips $i$, and is rotated by power being applied to apron-rollers K L, around which it passes. The carrier-apron receives the bundles of grain and carries them forward over the apron-floor $m$ and under the band-cutter shaft C and the spreader E. The apron carries the grain thence to the feed-roller N, which is situated over a point midway between the apron-roller L and feed-roller O. The grain is drawn between the belt H and rollers N O, which in turn force the distributed and spread-out grain in contact with the thrashing-cylinder. To accomplish this movement of the grain, all the working parts revolve in the direction indicated by arrows, and carry the grain to the thrashing-machine, to which this attachment is secured by bolts or other suitable means, and to accomplish these movements of the working parts various pulleys, belts, and gearing are necessary, which will now be described, the arrows indicating the direction of rotation.

The power is preferably applied to the double pulley $c\ c'$—the larger or smaller—according to speed required for band-cutters $d$. On the opposite end of the shaft C is pulley $c^2$, which communicates by band $p$ with a larger pulley, $e$, which gives velocity to the spreader E, to which it is attached. On the opposite end of spreader E is the double pulley $e'\ e^2$, which communicates by crossed band $r$ with a double pulley, $l\ l'$, on roller L, the band $r$ being placed on the larger or smaller pulley of each shaft, respectively, according to relative speed desired for the carrier-apron.

On the end of roller L opposite to double pulley $l\ l'$ is a gear-wheel, $l^2$, which rotates roller N by means of gear-wheel $n$. Gear-wheel $l^2$ also gears with the idle wheel or pinion $s$, through which the proper rotation of wheel $o$ and feed-roller O is secured. Suitable means of adjusting the working parts with reference to each other may be employed, if desired.

By referring to the arrows the direction of rotation of each part will be understood, and by reference to the double pulleys and belts it is readily apparent how the speed of carrying the grain forward and the consequent feeding of thrasher can be regulated. It is also obvious that the feeding is made more regular and in better form than when even skilled labor is employed to do the work of this attachment.

Having thus described my invention, what I claim as new, and desire to secure by Letters Patent, is—

1. The belt H and spreader E, having double pulley $e'$ $e^2$ and belt $r$, in combination with rollers L N O, the roller L having double pulley $l$ $l'$ and gearing $l^2$, and the gearing $n$, $s$, and $o$, by which the relative speed of the parts and feeding of grain are regulated, all as and for the purpose set forth.

2. The band-cutter shaft C, having cutter-disks $d$, and spreader E, having ribs $f$ and teeth $g$, in combination with rotating carrier-apron H, and rollers N L O, double pulleys, bands, and gears, substantially as set forth, whereby the relative speed of the parts and the feeding of grain are regulated, as set forth.

In testimony whereof I affix my signature in presence of two witnesses.

SAMUEL SAMUELS BARR.

Witnesses:
E. B. JONES,
MICHAEL McGRAW.